United States Patent
Omori

(10) Patent No.: US 10,921,107 B2
(45) Date of Patent: Feb. 16, 2021

(54) LENS-MEASURING MACHINE AND LENS-MEASUREMENT METHOD

(71) Applicant: MITUTOYO CORPORATION, Kanagawa (JP)

(72) Inventor: Yoshiyuki Omori, Hiroshima (JP)

(73) Assignee: MITUTOYO CORPORATION, Kanagawa (JP)

( * ) Notice: Subject to any disclaimer, the term of this patent is extended or adjusted under 35 U.S.C. 154(b) by 134 days.

(21) Appl. No.: 16/243,539

(22) Filed: Jan. 9, 2019

(65) Prior Publication Data
US 2019/0212121 A1    Jul. 11, 2019

(30) Foreign Application Priority Data

Jan. 11, 2018    (JP) .............................. JP2018-002686

(51) Int. Cl.
*G01B 5/008* (2006.01)
*G01B 5/20* (2006.01)
*G01M 11/08* (2006.01)

(52) U.S. Cl.
CPC ............... *G01B 5/008* (2013.01); *G01B 5/20* (2013.01); *G01M 11/08* (2013.01)

(58) Field of Classification Search
CPC .......... G01B 5/008; G01B 5/20; G01B 21/04; G01M 11/08; G01M 11/025
USPC ....................................................... 33/503
See application file for complete search history.

(56) References Cited

U.S. PATENT DOCUMENTS

| | | | | |
|---|---|---|---|---|
| 5,576,727 | A * | 11/1996 | Rosenberg | G01B 5/008 345/179 |
| 5,724,264 | A * | 3/1998 | Rosenberg | G01B 5/008 702/152 |
| 10,514,244 | B2 * | 12/2019 | Nakayama | G01B 5/201 |
| 2006/0191148 | A1 * | 8/2006 | Lippuner | G01C 1/02 33/290 |
| 2009/0051904 | A1 * | 2/2009 | Wang | G01M 11/0221 356/127 |
| 2011/0083497 | A1 * | 4/2011 | Matsumiya | G01B 11/245 73/105 |
| 2014/0109419 | A1 * | 4/2014 | Shindo | G01B 5/201 33/502 |

(Continued)

FOREIGN PATENT DOCUMENTS

JP    2010-164532 A    7/2010
WO    2013/121196 A1    8/2013

*Primary Examiner* — Yaritza Guadalupe-McCall
(74) *Attorney, Agent, or Firm* — Greenblum & Bernstein, P.L.C.

(57) ABSTRACT

A lens-measuring machine includes: a table rotatable around a rotation axis; a lens holder that holds a workpiece in a form of a lens, the lens holder being placed on the table so that an optical axis of the lens becomes orthogonal to the rotation axis; a contact tip that contacts a measurement surface of the lens; an angle sensor for detecting a rotary angle of the table; a displacement detector for detecting a displacement of the contact tip; and a controller for calculating coordinates information of the measurement surface of the lens in a form of polar coordinates, whose origin is at the rotation axis, based on displacement of the contact tip for every predetermined rotary angle of the table, the controller converting the calculated polar coordinates into Cartesian coordinates.

8 Claims, 17 Drawing Sheets

(56) References Cited

U.S. PATENT DOCUMENTS

| | | | | |
|---|---|---|---|---|
| 2014/0190027 A1* | 7/2014 | Abe | ............... | G01B 5/008 33/503 |
| 2015/0130906 A1* | 5/2015 | Bridges | ............ | G01B 5/012 348/46 |
| 2015/0345932 A1* | 12/2015 | Wakai | ............ | G01B 21/047 33/503 |
| 2017/0211927 A1* | 7/2017 | Bridges | ............ | G01B 5/012 |
| 2018/0073852 A1* | 3/2018 | Nakayama | ......... | G01B 5/201 |
| 2018/0364021 A1* | 12/2018 | Takahashi | ......... | G01B 21/045 |
| 2019/0049229 A1* | 2/2019 | Omori | ............. | G01B 5/204 |
| 2019/0212121 A1* | 7/2019 | Omori | ............. | G01B 5/008 |

* cited by examiner

FIG.11
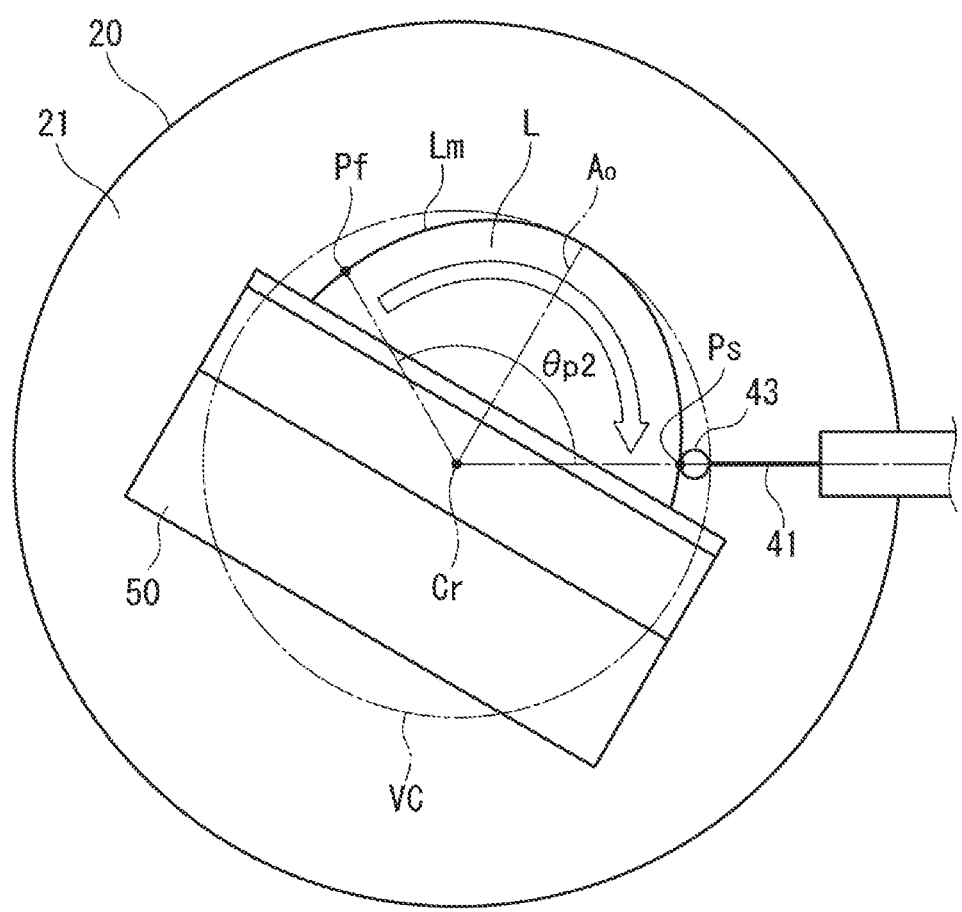
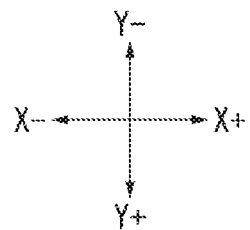

FIG.12
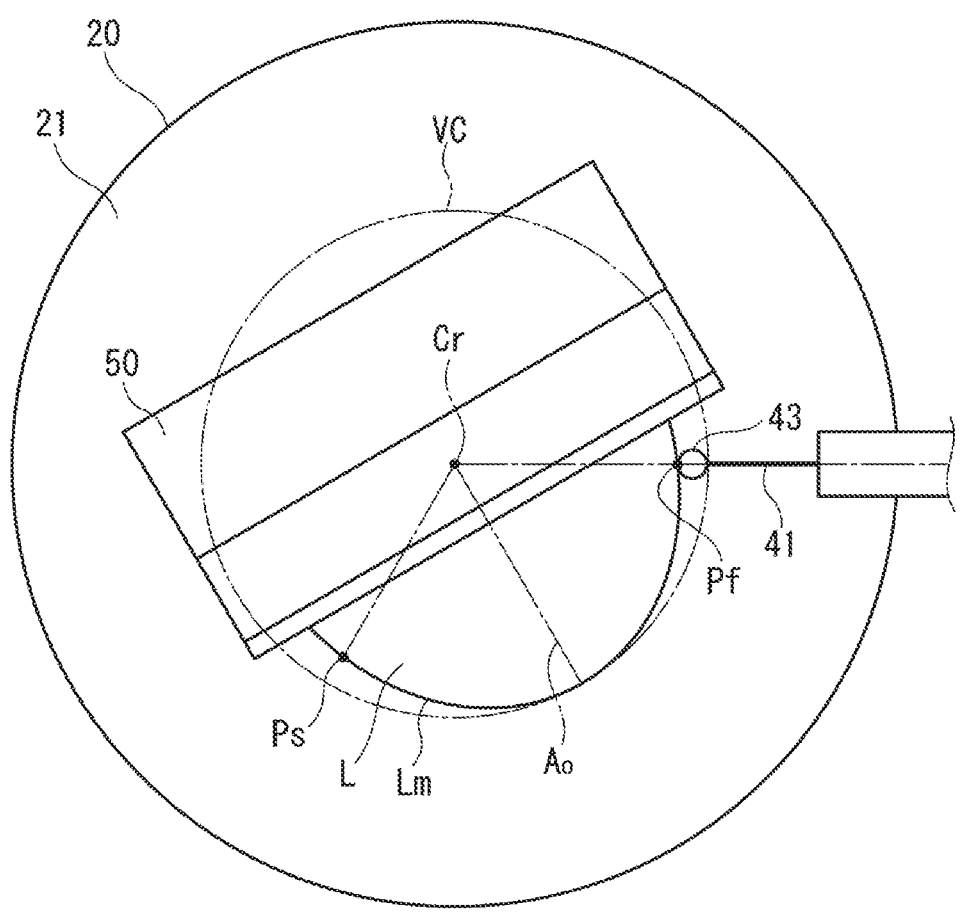
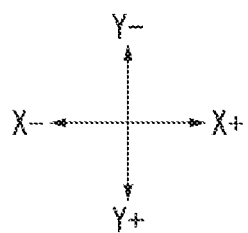

LENS-MEASURING MACHINE AND LENS-MEASUREMENT METHOD

The entire disclosure of Japanese Patent Application No. 2018-002686 filed Jan. 11, 2018 is expressly incorporated by reference herein.

TECHNICAL FIELD

The present invention relates to a lens-measuring machine and a lens-measurement method for measuring a lens profile.

BACKGROUND ART

Surface profiles of lenses requiring high profile accuracy have been typically measured using a contact profile-measuring machine. For instance, Patent Literature 1 (JP-2010-164532 A) discloses that a linear movement profile measuring machine is used to perform a contact-scanning measurement of a surface of a lens to determine a cross-sectional profile of the lens.

Some of aspheric lenses (e.g. wide-angle lenses) have recently come to exhibit a large offset from a reference spherical surface, making it difficult to measure the surface profile of such lenses with high accuracy. It should be noted that the "offset" herein is a difference between the spherical surface and an actual surface of the lens from a center of curvature of the spherical surface.

For instance, as shown in FIG. 17, when an effective angular range R1 of a lens L covers approximately 90 degrees around a center of curvature C of a reference spherical surface S (i.e. within ±45 degrees with respect to an optical axis Ao), a maximum offset $\Delta d1$ from the reference spherical surface S is relatively small in the effective angular range R1. Accordingly, an area of a contact tip 401 contacting the surface of the lens L is relatively small, though gradually changing depending on contact positions on the surface of the lens L. Thus, the contact-scanning measurement of the lens L can be performed without significant disadvantages.

However, when an effective angular range R2 of the lens L covers approximately 140 degrees around the center of curvature C (i.e. ±70 degrees with respect to the optical axis Ao) as shown in FIG. 17, a maximum offset $\Delta d2$ from the reference spherical surface S is relatively large in the effective angular range R2. Accordingly, as the contact tip 401 contacts the surface of the lens L while gradually changing the contact positions, wide area of the contact tip 401 comes to contact the surface of the lens L. For instance, the portion of the contact tip 401 contacting the lens L at or around a vertex thereof is greatly different from the portion of the contact tip 401 contacting the lens L at a periphery of the effective angular range R2. Thus, the measurement accuracy is greatly affected by the sphericity of the contact tip 401, resulting in deterioration in the measurement accuracy.

Patent Literature 2 (WO 2013/121196) discloses a profile measuring method for solving the above problem. In the profile measuring method disclosed in Patent Literature 2, after the lens is placed on a rotary base, a stylus is inclined in conformity with a surface of a first half of one side of a lens. Then, after the surface of the first half of the one side of the lens is measured using the inclined stylus, the rotary base is rotated by 180 degrees and a surface of a second half of the one side of the lens is measured in the same manner. The coordinate systems of the resultant two sets of measurement data are different. Accordingly, the cross-sectional profile of the lens is obtained by applying a stitching process on the measurement data. According to the profile measuring method of Patent Literature 2, the area of the contact tip of the stylus contacting the surface of the lens is narrower than that in the typical contact-scanning measurement.

However, the profile measuring method disclosed in Patent Literature 2, which inclines the stylus in conformity with the first or second half of the surface of the one side of the lens, complicates the structure and control of the machine used for the profile measuring method. In addition, since the two measurement data with different coordinate systems have to be stitched, the data processing becomes complicated.

SUMMARY OF THE INVENTION

An object of the invention is to provide a lens-measuring machine and a lens-measurement method capable of highly accurately and easily measuring a lens profile.

A lens-measuring machine according to an aspect of the invention includes; a table rotatable around a rotation axis; a lens holder configured to hold a workpiece in a form of a lens, the lens holder being placed on the table so that an optical axis of the lens becomes orthogonal to the rotation axis; a contact tip configured to contact a lens measurement surface defined at a part of a surface of the lens; an angle sensor configured to detect a rotary angle of the table; a displacement detector configured to detect a displacement of the contact tip; and a data processor configured to calculate coordinates information of the lens measurement surface in a form of polar coordinates whose origin is at the rotation axis based on the displacement of the contact tip for every rotary angle of the table, and convert the calculated polar coordinates to Cartesian coordinates.

In the above aspect of the invention, the lens measurement surface refers to an area of a surface of the lens capable of being determined as desired by a measurer, which may be a convex or concave aspherical surface or a (convex or concave) spherical surface. It is preferable that the lens measurement surface is disposed along the rotation direction of the table when the lens holder holding the lens is placed on the table.

In the above aspect of the invention, when the table with the lens being placed thereon is rotated by a predetermined angle, the contact tip slides while contacting the lens measurement surface, causing a displacement in conformity with the profile of the lens measurement surface. In other words, the contact tip contact-scans the lens measurement surface along the rotation direction of the table.

During the above-described contact-scanning, the contact tip contacts the lens measurement surface at an approximately constant angle.

For instance, when the lens measurement surface is spherical, the contact tip contacts the lens measurement surface at a constant angle by a certain portion of the contact tip.

When the lens measurement surface is aspherical, the angle of the contact tip with respect to the lens measurement surface slightly changes depending on the magnitude of the deviation between the spherical surface and the aspherical surface. However, the portion of the contact tip contacting the lens measurement surface is kept sufficiently narrow as compared with a typical contact-scanning.

Even when the orientation of the lens measurement surface is slightly deviated with respect to the rotary direction of the table, the portion of the contact tip contacting the lens measurement surface is kept sufficiently narrow as compared with a typical contact-scanning measurement.

Accordingly, the above aspect of the invention reduces influence of sphericity of the contact tip on the measurement accuracy, thereby allowing a highly accurate measurement.

The typical roundness measuring machine can be used for the above-described contact-scanning, thus requiring no complicated machine arrangement and control thereof. Further, since the data processor is configured to obtain the polar coordinates of the lens measurement surface in a form of continuous measurement data, no additional step for stitching the measurement data with different coordinate systems as in typical device is necessary. The data processor also can easily obtain the profile information of the lens measurement surface through the conversion of the polar coordinates into Cartesian coordinates using a known formula.

Accordingly, the above aspect of the invention provides a lens-measuring machine capable of highly accurately and easily measuring the lens profile.

In the lens-measuring machine according to the above aspect of the invention, it is preferable that the lens holder is placed on the table so that a center of curvature of a predetermined area of the lens measurement surface coincides with the rotation axis.

According to the above arrangement, the lens measurement surface can be suitably located along the rotation direction of the table. Accordingly, the portion of the contact tip contacting the lens can be narrower. It should be noted that, though the predetermined area of the lens measurement surface based on which the center of curvature is determined is not specifically limited, the predetermined area is an area on the lens measurement surface intersecting the optical axis, for instance.

In the lens-measuring machine according to the above aspect of the invention, it is preferable that the lens-measuring machine further includes: a driver configured to move the contact tip along the rotation axis so that the contact tip contacts the lens measurement surface; and an adjustment amount calculator configured to calculate a coarse adjustment amount for adjusting an attitude of the lens so that the optical axis of the lens becomes orthogonal to the rotation axis based on drive information of the contact tip moved by the driver.

In the above arrangement, the contact tip may continuously or continually contacts the lens measurement surface along the rotation axis. Specifically, the lens measurement surface may be measured by contact-scanning measurement or by multiple-point measurement along the rotation axis.

The adjustment amount calculator, which can obtain the orientation of the current lens measurement surface based on the drive information of the contact tip moved by the driver, can calculate the coarse adjustment amount for adjusting the attitude of the lens so that the optical axis of the lens becomes orthogonal to the rotation axis. By adjusting the attitude of the lens based on the coarse adjustment amount, the attitude of the lens can be more precisely adjusted and the lens measurement surface can be more accurately measured at a later stage.

It should be noted that, since the drive information of the contact tip moved by the driver is usually less accurate than the displacement of the contact tip, the attitude of the lens is coarsely determined in this stage. Accordingly, the coarse adjustment amount is information for adjusting the coarsely calculated attitude of the lens.

In the lens-measuring machine according to the above aspect of the invention, it is preferable that the adjustment amount calculator is configured to calculate a fine adjustment amount for adjusting the attitude of the lens so that the optical axis of the lens becomes orthogonal to the rotation axis based on plural sets of the Cartesian coordinates obtained at different positions in a direction along the rotation axis.

According to the above arrangement, the adjustment amount calculator can calculate the fine adjustment amount for adjusting the attitude of the lens more accurately than the coarse adjustment amount by, for instance, comparing the Cartesian coordinates of the lens measurement surface with the designed value of the lens. By adjusting the attitude adjustment of the lens based on the fine adjustment amount, the lens measurement surface can be more accurately measured.

A method of measuring a lens according to another aspect of the invention uses a lens-measuring machine comprising a table configured to rotate around a rotation axis, a contact tip configured to contact a workpiece placed on the table, an angle sensor configured to detect a rotary angle of the table, and a detector configured to detect a displacement of the contact tip, the method including: placing the workpiece in a form of a lens on the table so that an optical axis of the lens becomes orthogonal to the rotation axis; contact-scanning a lens measurement surface, which is defined by a predetermined area on a surface of the lens, by bringing the contact tip into contact with the lens measurement surface and rotating the table with the lens placed thereon by a predetermined angle; calculating coordinates information of the lens measurement surface in a form of polar coordinates whose origin is at the rotation axis based on displacement of the contact tip for every rotary angle of the table; and converting the calculated polar coordinates to Cartesian coordinates.

According to the above aspect of the invention, the lens profile can be highly accurately and easily measured as in the above-described lens-measuring machine.

In the method of measuring a lens according to the above aspect of the invention, it is preferable that the lens is placed so that a center of curvature of a predetermined area of the lens measurement surface coincides with the rotation axis.

According to the above process, the lens measurement surface can be suitably located along the rotation direction of the table. Accordingly, the portion of the contact tip in contact with the lens can be narrower.

In the method of measuring a lens according to the above aspect of the invention, it is preferable that the method further includes, after placing the lens and before contact-scanning the lens-measurement surface: moving the contact tip along the rotation axis so that the contact tip contacts the lens measurement surface; calculating a coarse adjustment amount for adjusting an attitude of the lens so that the optical axis of the lens becomes orthogonal to the rotation axis based on drive information of the contact tip in moving the contact tip; and adjusting the attitude of the lens based on the coarse adjustment amount.

According to the above process, the subsequent fine adjustment step can be more precisely conducted and the lens measurement surface can be more accurately measured as in the above-described lens-measuring machine.

In the method of measuring a lens according to the above aspect of the invention, it is preferable that the method further includes, after placing the lens and before contact-scanning the lens-measurement surface: preliminarily measuring the lens measurement surface at mutually different positions in a direction along the rotation axis; calculating a fine adjustment amount for adjusting an attitude of the lens so that the optical axis of the lens becomes orthogonal to the rotation axis based on plural sets of the Cartesian coordinates obtained in the preliminarily measuring of the lens measurement surface; and adjusting the attitude of the lens based on the fine adjustment amount.

According to the above process, the lens measurement surface can be more accurately and easily measured as in the above-described lens-measuring machine.

According to the aspects of the invention, a lens-measuring machine and a lens-measurement method capable of highly accurately and easily measuring a lens profile can be provided.

BRIEF EXPLANATION OF DRAWINGS

FIG. 11 is another schematic illustration showing the relationship between the lens and the contact tip in the lens-measuring process according to the exemplary embodiment.

FIG. 12 is still another schematic illustration showing the relationship between the lens and the contact tip in the lens-measuring process according to the exemplary embodiment.

DESCRIPTION OF EMBODIMENT(S)

Exemplary embodiment(s) of the invention will be described below with reference to the attached drawings.

Lens-Measuring Machine

Figure 1:
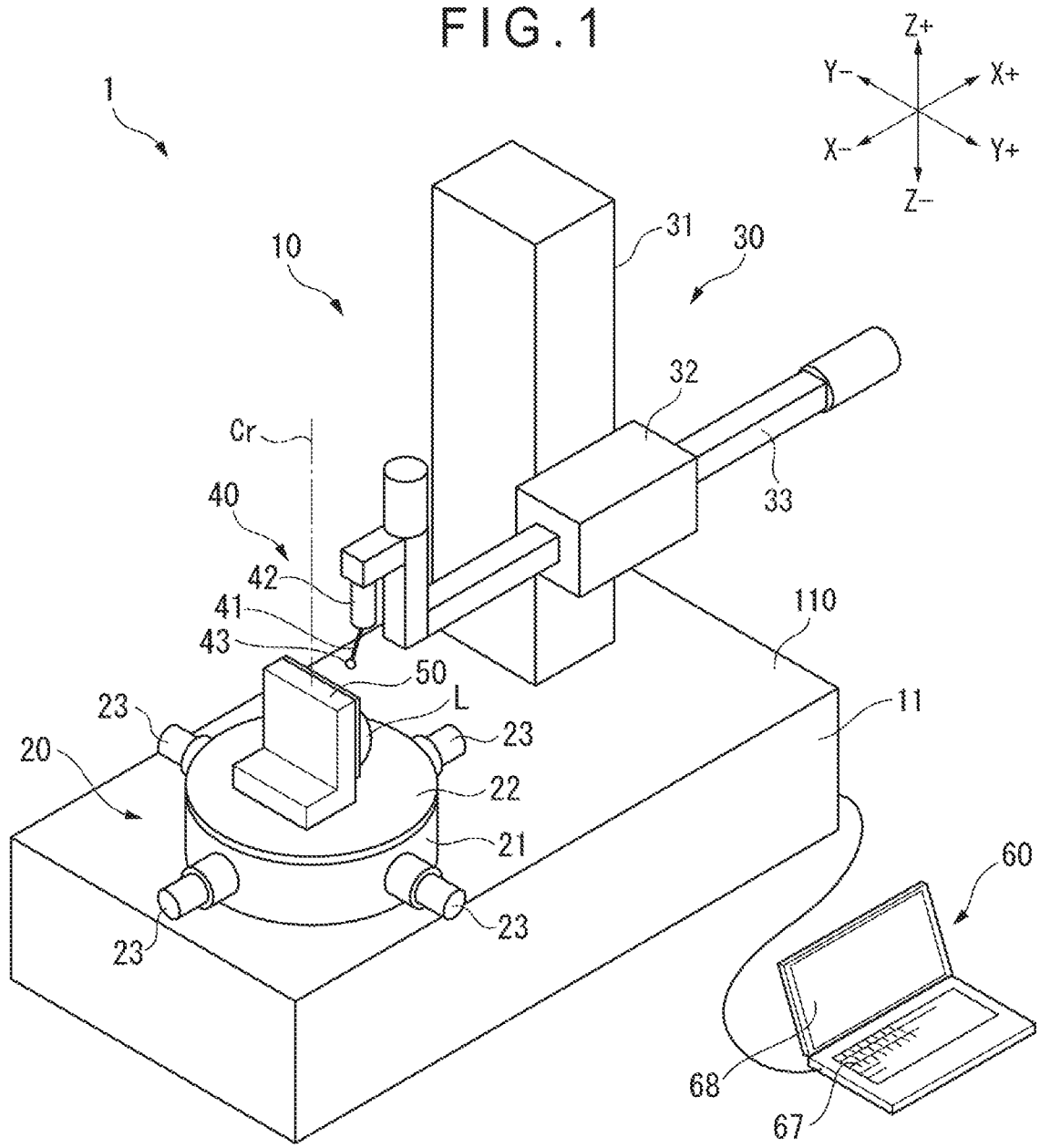
FIG. 1 is a perspective view showing a lens-measuring machine according to an exemplary embodiment of the invention.

As shown in FIG. 1, a lens-measuring machine 1 includes a measuring machine body 10, and a controller 60 configured to control the movement of the measuring machine body 10 and to import and process measurement data obtained by the measuring machine body 10.

An existing roundness measuring machine is usable as the measuring machine body 10.

Specifically, the measuring machine body 10 includes: a base 11; a table 20 provided on an upper face 110 of the base 11; a detector driver 30 provided near the table 20; and a detector 40 supported by the detector driver 30.

The table 20 is rotated by a rotary drive 25 (see FIG. 2) provided in the table 20. The table 20 is placed so that a rotation axis Cr of the table 20 is aligned with a vertical direction (Z-axis direction) on the upper face 110 of the base 11. An angle sensor 26 (see FIG. 2) configured to read a rotary angle $\theta$ of the table 20 is provided in the table 20.

The table 20 includes: a cylindrical body 21 rotatably provided on the base 11; a disc-shaped stage plate 22 provided on an upper face of the body 21; and an adjuster 23 configured to adjust a position and inclination of the stage plate 22 with respect to the body 21. The adjuster 23 includes a movement mechanism configured to move the stage plate 22 within a plane (XY plane) orthogonal to the rotation axis Cr, and an inclination mechanism configured to incline the stage plate 22 with respect to the XY plane, the movement and inclination mechanisms each being driven by a motor.

The detector driver 30 (driver of the invention) is disposed adjacent to the table 20 in +X-axis direction on the upper face 110 of the base 11. The detector driver 30 includes a column 31 extending from the upper face 110 of the base 11 in a Z-axis direction, a slider 32 attached to the column 31, and an arm 33 attached to the slider 32 and extending in the X-axis direction. The detector 40 having a stylus 41 is attached to an end of the arm 33 in −X-axis direction.

The arm 33 is movable in the X-axis direction with respect to the slider 32 via an X-axis drive mechanism (not shown) installed within the slider 32. The slider 32 is movable in the Z-axis direction with respect to the column 31 via a Z-axis drive mechanism (not shown). Thus, the detector driver 30 is capable of adjusting X-axis and Z-axis positions of the detector 40 with respect to the table 20.

The detector 40 includes the stylus 41 and a displacement detector 42 configured to detect displacement of the stylus 41. The stylus 41 extends in, for instance, −X-axis and −Z-axis directions. A spherical contact tip 43 configured to contact the lens L (workpiece) is provided on an end of the stylus 41.

The stylus 41 of the detector 40 is displaceable in the X-axis direction. When the stylus 41 is displaced in the X-axis direction, the displacement detector 42 outputs signals in proportion to displacement $\Delta r$ of the stylus 41.

The measuring machine body 10 further includes a lens holder 50 configured to hold the lens L (workpiece).

Figure 3:
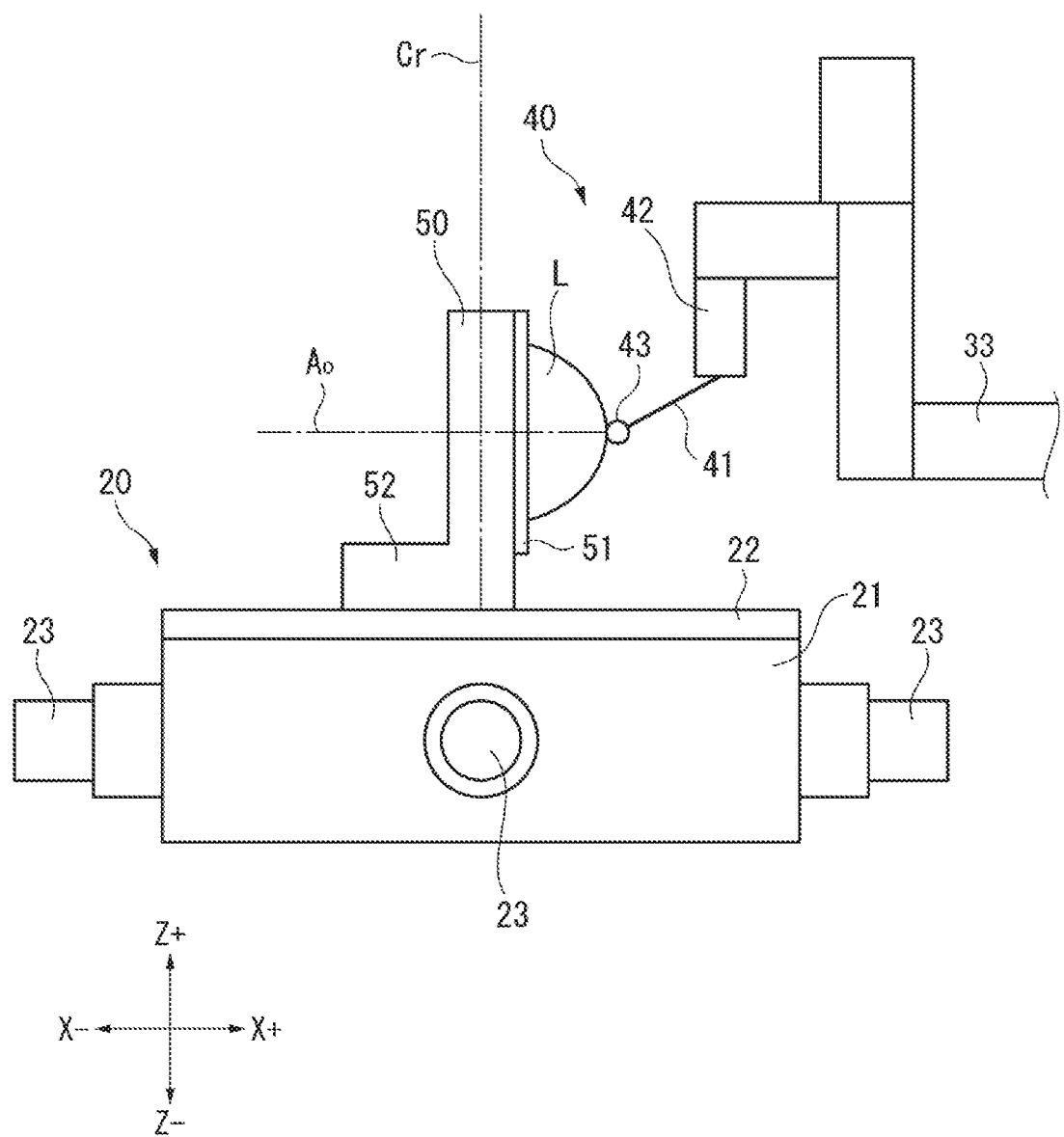
FIG. 3 is a schematic illustration of a table, a lens holder and a detector according to the exemplary embodiment.

An existing lens holder is usable as the lens holder 50. The lens holder 50 detachably holds the lens L. As shown in FIG. 3, the lens holder 50 is placed on the stage plate 22 with the lens L being held thereon. In this exemplary embodiment, the lens holder 50 includes a grip 51 configured to grip a periphery of the lens L, and an L-shaped block 52 on which the grip 51 is provided.

It is preferable for the lens holder 50 to hold the lens L so that the optical axis Ao of the lens L becomes orthogonal to the rotation axis Cr of the table 20.

Figure 2:
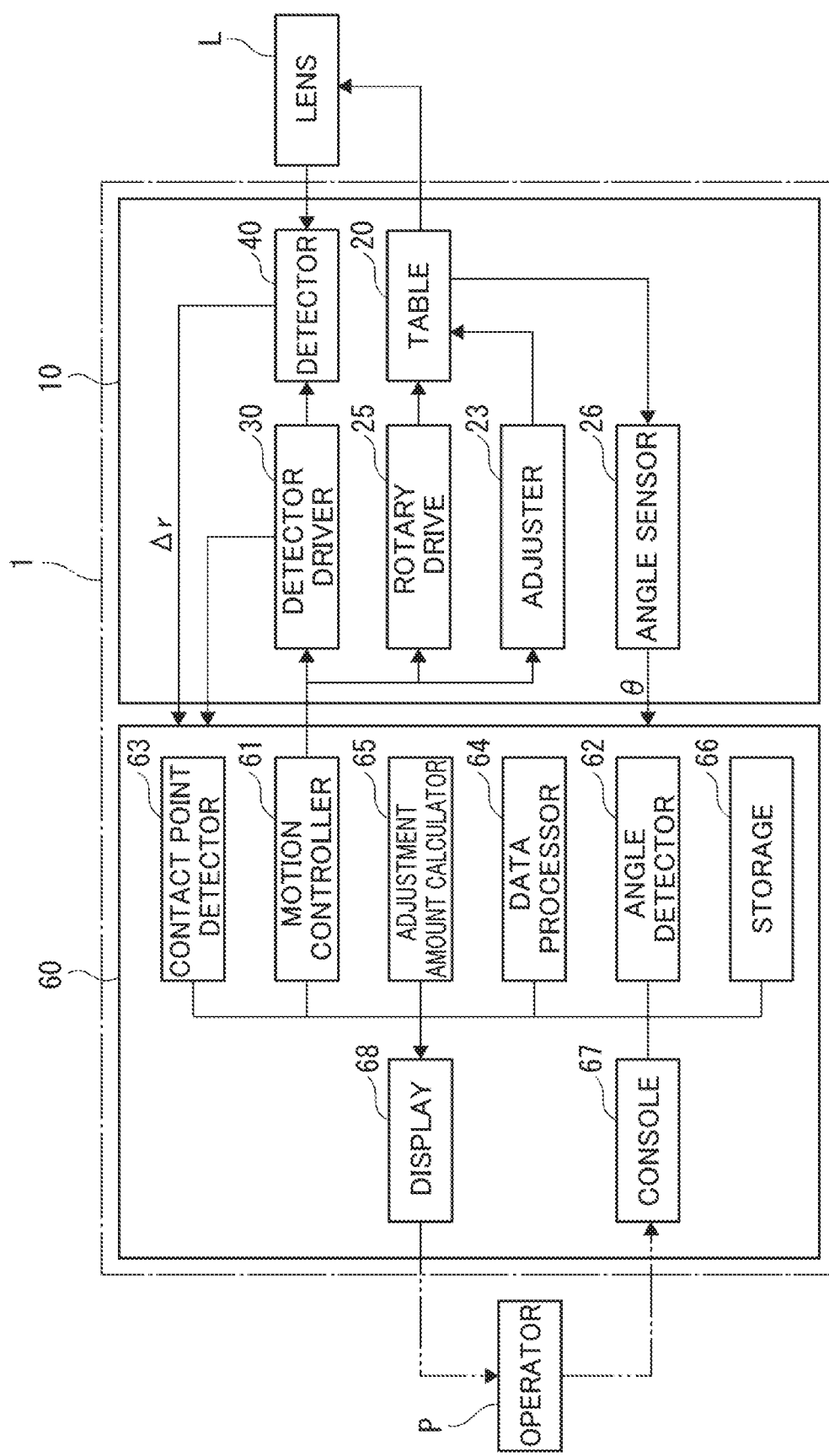
FIG. 2 is block diagram showing a structure of the lens-measuring machine according to the exemplary embodiment.

The controller 60, which is an existing personal computer or the like, is configured to run a predetermined control software to serve as a motion controller 61, an angle detector 62, a contact point detector 63, a data processor 64, and an adjustment amount calculator 65 as shown in FIG. 2. These components in combination perform below-described level adjustment process and lens-measuring process. The controller 60 also includes a storage 66 storing designed values of the lens L (workpiece) and the like.

The controller 60 additionally includes a console 67 (e.g. a keyboard) and a display 68 (e.g. a monitor device). An operator P can operate the measuring machine body 10 and read information through the console 67 and/or the display 68.

Though the controller 60 is a component independent of the measuring machine body 10 in the exemplary embodiment, the controller 60 may be incorporated in the measuring machine body 10.

Level Adjustment Process

Next, a lens-measurement method with use of the lens-measuring machine 1 will be described below.

In the lens-measurement method according to the exemplary embodiment, after a level adjustment process of the lens L is performed, a lens-measuring process is performed. The level adjustment process is a process for setting the optical axis Ao of the lens L to be orthogonal to the rotation axis Cr of the table 20.

Figure 4:
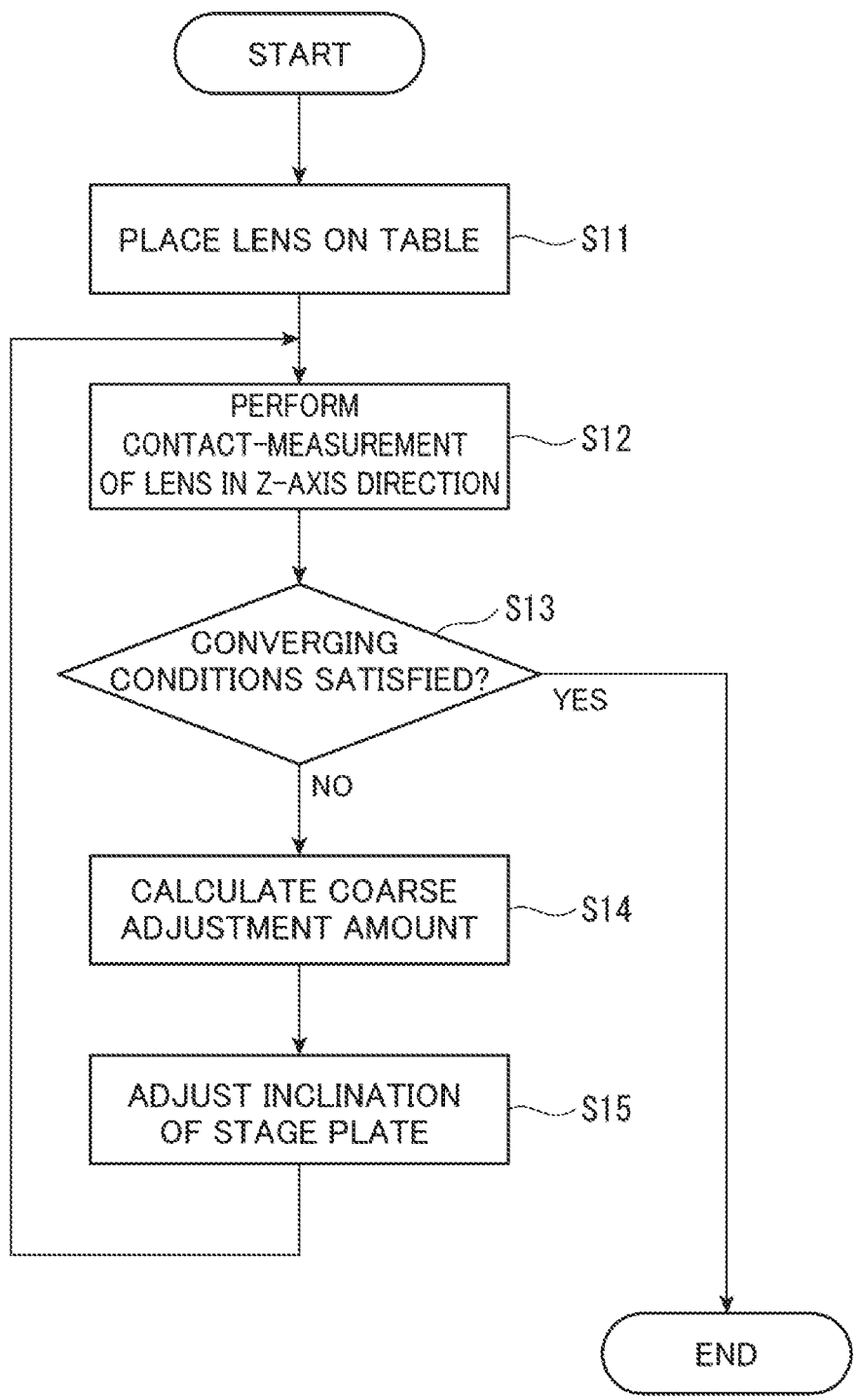
FIG. 4 is a flow chart showing a first stage of a level adjustment process according to the exemplary embodiment.

A first stage of the level adjustment process will be described below with reference to a flow chart in FIG. 4. It should be noted that a lens measurement surface Lm is a convex aspherical surface of the lens L in this exemplary embodiment.

Initially, the lens holder 50 holding the lens L is placed on the upper face of the table 20 by an operator P or the like (Step S11; lens-placement step). At this time, the lens L is placed so that the lens measurement surface Lm faces the detector 40 (in +X-axis direction) as shown in FIG. 5.

Figure 5:
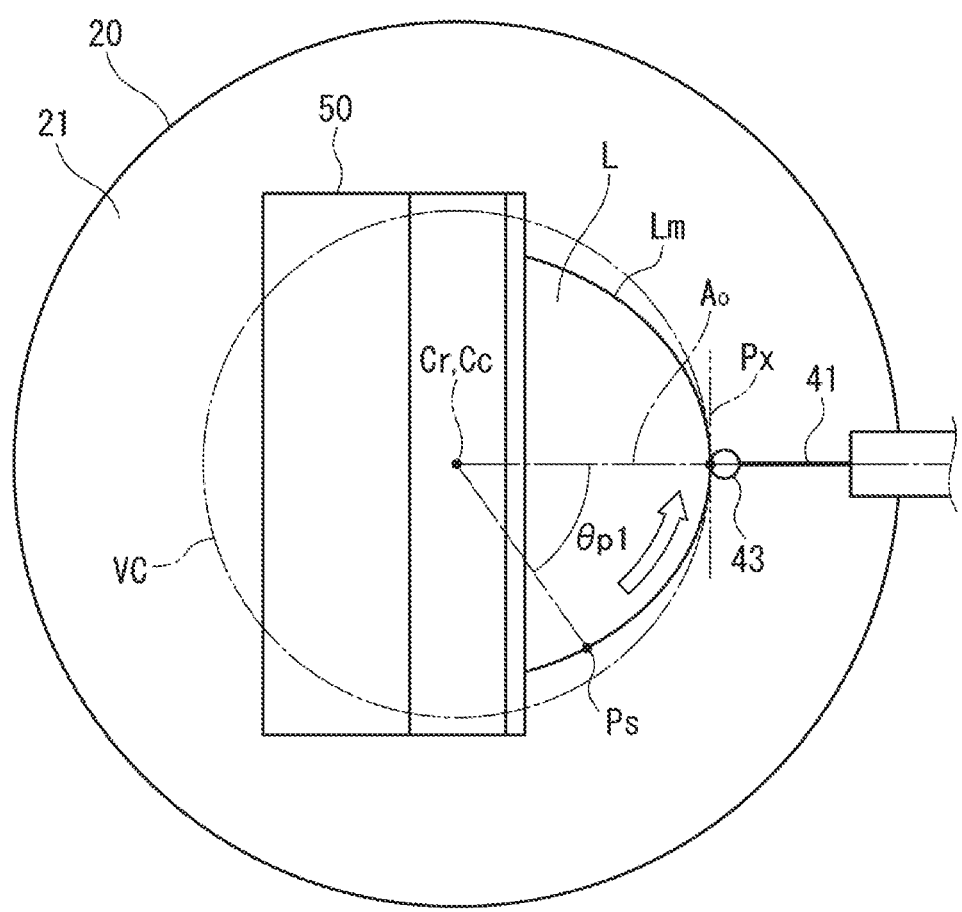
FIG. 5 is a schematic illustration showing a relationship between a lens and a contact tip in the first stage of the level adjustment process according to the exemplary embodiment.

It should be noted that, in Step S11, it is preferable that the optical axis Ao of the lens L is substantially aligned with the X-axis direction as show in FIG. 5. Further, it is preferable that; when the lens L is seen in the direction of the rotation axis Cr, a center of curvature Cc of an area of the lens measurement surface Lm intersecting the optical axis Ao substantially coincides with the rotation axis Cr. When the lens L is disposed as described above, the lens measurement surface Lm is suitably located along the rotation direction of the table 20. It should be noted that a circle shown by an imaginary line (chain line) in FIG. 5 is an approximate circle VC of the lens measurement surface Lm, the radius of the approximate circle VC being a curvature radius at the area of the lens measurement surface Lm intersecting the optical axis Ao and the center of the approximate circle VC being the center of curvature Cc when the lens L is seen in the direction of the rotation axis Cr.

After Step S11, the detector 40 performs the contact-scanning measurement of the lens measurement surface Lm in the Z-axis direction (Step S12; drive step). Specifically, the motion controller 61 controls the motion of the detector 40 in the Z-axis direction and X-axis direction via the detector driver 30 so that the stylus 41 slides on the lens measurement surface Lm along the Z-axis direction while contacting the lens measurement surface Lm. In other words, the stylus 41 moves in the Z-axis direction following the surface profile of the lens measurement surface Lm (see arrows M1 in FIG. 6). The adjustment amount calculator 65 acquires following motion information of the detector 40 based on a scale or the like provided on the detector driver 30 to calculate profile information (XZ cross-sectional information) of the lens measurement surface Lm along a scanning line of the contact tip 43.

Figure 6:
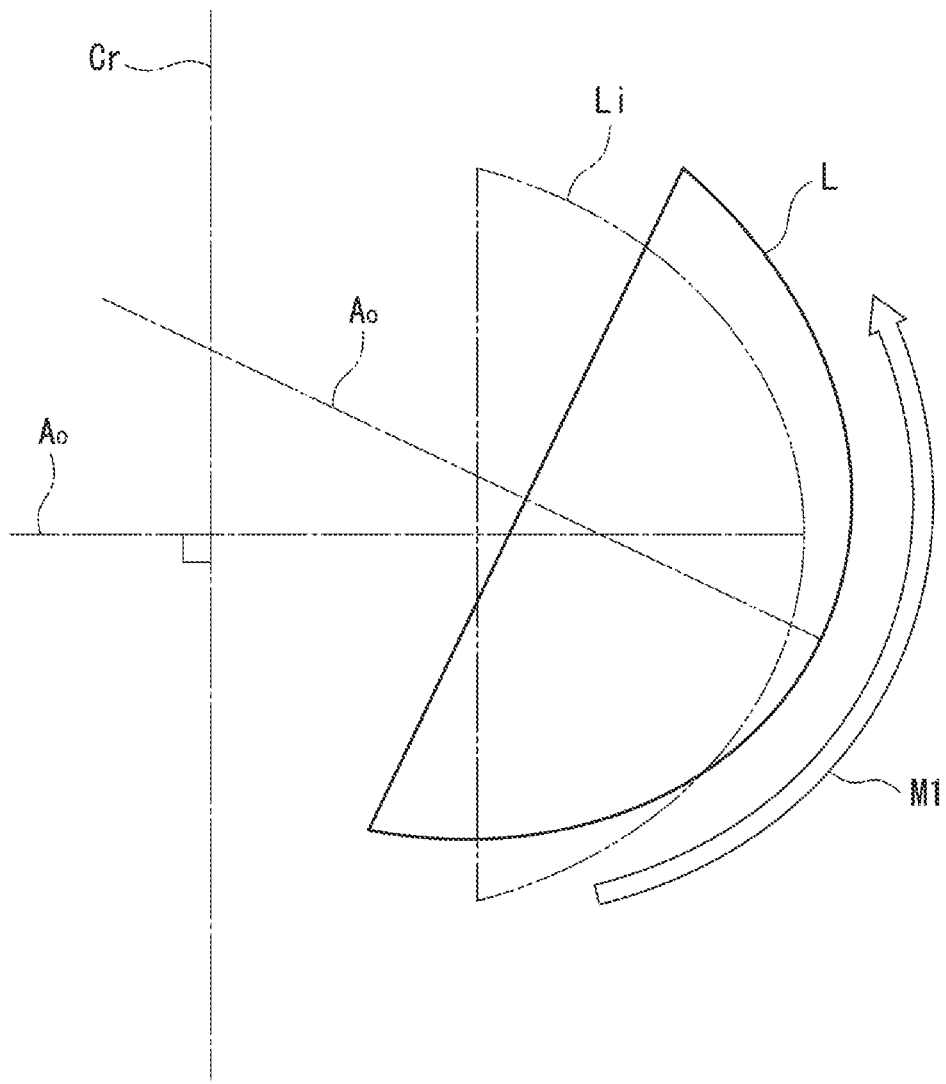
FIG. 6 is a schematic illustration showing the lens in the first stage of the level adjustment process according to the exemplary embodiment.

It should be noted that the lens L in Step S12 is illustrated in actual lines and a lens Li in an ideal attitude, where the optical axis Ao is orthogonal to the rotation axis Cr, is shown in imaginary lines (chain double-dashed lines) in FIG. 6. Further, for the convenience of explanation, the inclination of the lens L with respect to the lens Li (i.e. deviation from a state in which the optical axis Ao of the lens L is orthogonal to the rotation axis Cr) is exaggerated in FIG. 6.

The adjustment amount calculator 65 compares the profile information of the lens measurement surface Lm obtained in Step S12 with the designed value of the lens L stored in the storage 66 to analyze the attitude of the lens L placed on the table 20 (i.e. the state of the optical axis Ao), and determine whether the attitude of the lens L satisfies converging conditions (Step S13). It should be noted that the converging conditions refer to conditions to be satisfied in order to adjust the attitude of the lens L to the ideal attitude within a tolerable error and are set, for instance, at a level sufficient to perform the second stage of the level adjustment process.

When it is determined that the attitude of the lens L satisfies the converging conditions (Step S13; Yes), the first stage of the level adjustment process is ended.

In contrast, when it is determined that the attitude of the lens L does not satisfy the converging conditions (Step S13; No), a coarse adjustment amount for adjusting the attitude of the lens L is calculated (Step S14; coarse-adjustment-amount calculation step).

It should be noted that, since the following motion amount of the stylus 41 is usually less accurate than the displacement Δr of the stylus 41, the attitude of the lens L is coarsely determined in Step S13. Accordingly, the coarse adjustment amount is information for adjusting the coarsely calculated attitude of the lens L.

The motion controller 61 controls the adjuster 23 based on the coarse adjustment amount calculated in Step S14 to adjust the attitude of the stage plate 22 of the table 20 (Step S15; coarse adjustment step). Alternatively, the operator P may check the coarse adjustment amount calculated in Step S13 via the display 68 and manually operate the adjuster 23, Thus, the optical axis Ao of the lens L is coarsely adjusted so as to be orthogonal to the rotation axis Cr. In other words, the optical axis Ao of the lens L is roughly level-adjusted with respect to a plane orthogonal to the rotation axis Cr.

Subsequently, the process returns to Step S12 and Steps S12 to S15 are repeated until the attitude of the lens L satisfies the converging conditions.

Figure 7:
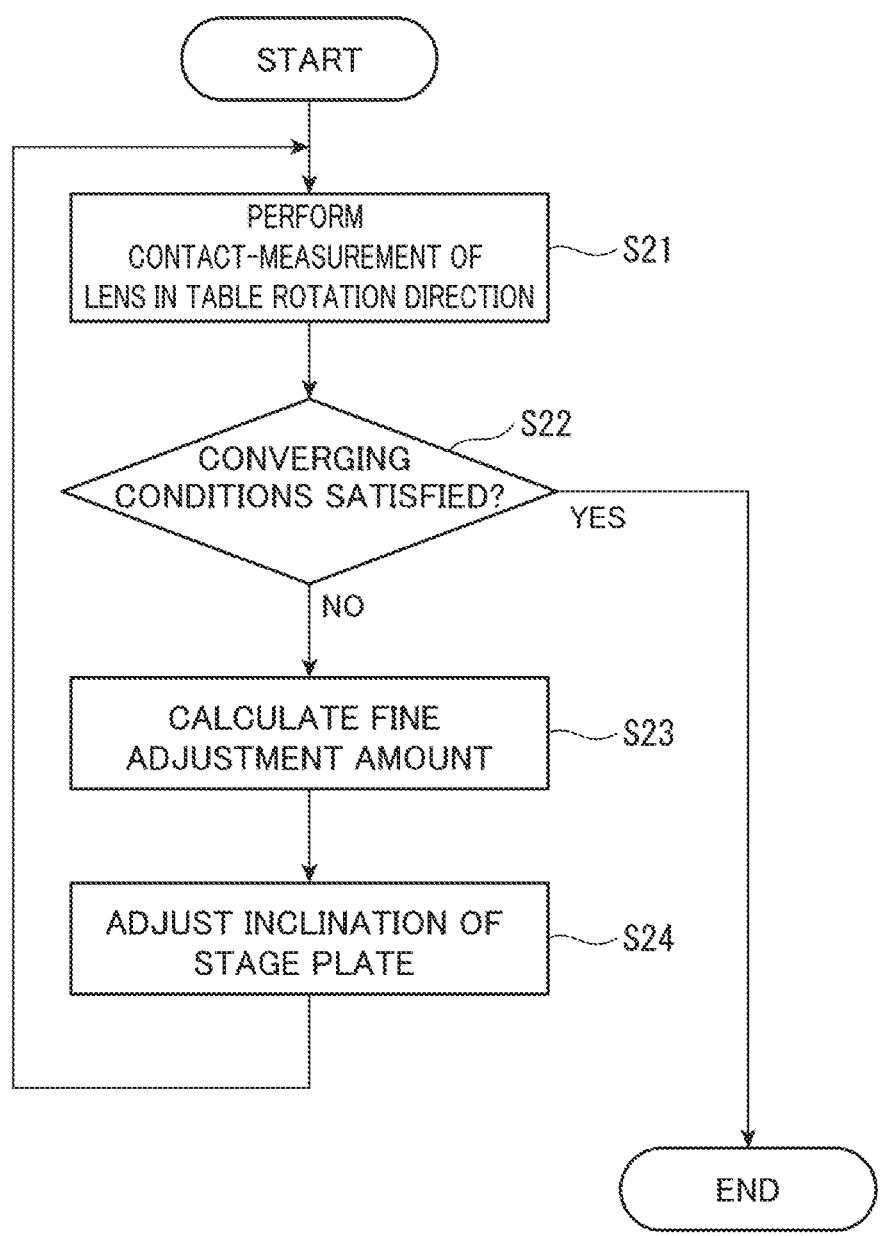
FIG. 7 is a flow chart showing a second stage of the level adjustment process according to the exemplary embodiment.

After completion of the first stage of the level adjustment process, the second stage is started. The second stage of the level adjustment process will be described below with reference to a flow chart in FIG. 7.

Initially, the motion controller 61 controls the detector driver 30 and the rotary drive 25, so that the detector 40 performs the contact-scanning measurement of the lens L in the rotation direction of the table 20 at a plurality of desired positions in the Z-axis direction (Step S21; preliminary measurement step). The contact-scanning measurement in Step S21 is substantially the same as later-described lens-measuring process (Steps S31 to S35) except that there are multiple measurement positions in the Z-axis direction. Accordingly, a detailed explanation will not be made herein.

Through Step S21, the profile information (XY cross-sectional information) of the lens measurement surface Lm at the desired multiple positions in the Z-axis direction is obtained.

During Step S21, the contact-scanning measurement of the lens L is performed in the rotation direction of the table 20 at the multiple of positions mutually different in the Z-axis direction. The directions of the contact-scanning measurement in Step S21 are exemplarily shown by arrows M2 in FIG. 8. The profile information of the lens measurement surface Lm at the mutually different positions in the Z-axis direction is thus obtained.

Figure 8:
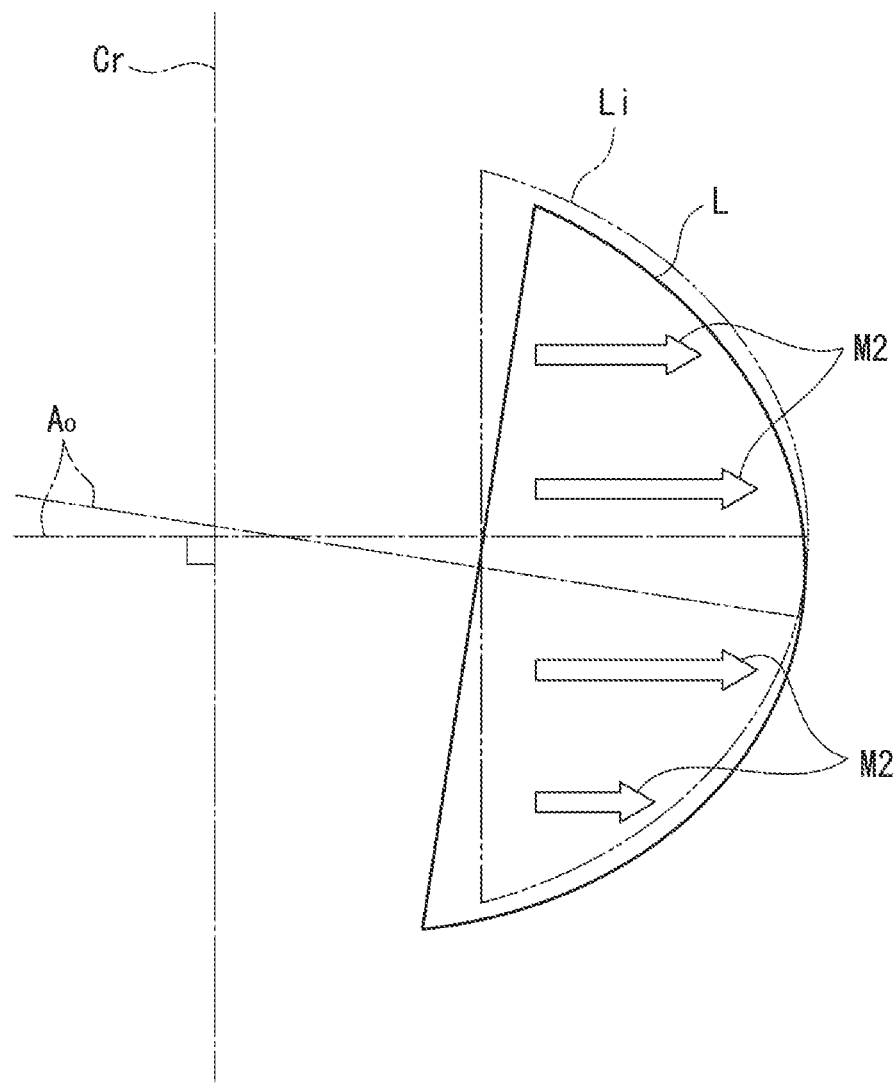
FIG. 8 is a schematic illustration showing the lens in a second stage of the level adjustment process according to the exemplary embodiment.

It should be noted that the lens L in Step S21 is illustrated in actual lines and the lens Li in an ideal attitude, where the optical axis Ao is orthogonal to the rotation axis Cr, is shown in imaginary lines (chain double-dashed lines) in FIG. 8, Further, for the convenience of explanation, the inclination of the lens L with respect to the lens Li (i.e. deviation from a state in which the optical axis Ao of the lens L is orthogonal to the rotation axis Cr) is exaggerated in FIG. 8. However, the inclination of the lens L in FIG. 8 is smaller than the inclination of the lens L in FIG. 6.

The adjustment amount calculator 65 compares the measurement data obtained in Step S21 with the designed value of the lens L stored in the storage 66 to analyze the attitude of the lens L placed on the table 20 (i.e. the state of the optical axis Ao), and determine whether the inclination of the lens L satisfies the converging conditions (Step S22). It should be noted that the converging conditions in the second stage of the level adjustment process are set at a level sufficient for performing the subsequent measurement operation, and thus are stricter than the converging conditions in the first stage.

When it is determined that the attitude of the lens L satisfies the converging conditions (Step S22; Yes), the second stage of the level adjustment process is ended.

In contrast, when it is determined that the attitude of the lens L does not satisfy the converging conditions (Step S22; No), a fine adjustment amount for adjusting the attitude of the lens L is calculated (Step S23; fine-adjustment-amount calculation step).

The motion controller 61 controls the adjuster 23 based on the fine adjustment amount calculated in Step S23 to adjust the inclination of the stage plate 22 of the table 20 (Step S24; fine adjustment step). Alternatively, the operator P may check the fine adjustment amount calculated in Step S24 via the display 68 and manually operate the adjuster 23. Thus, the optical axis Ao of the lens L is adjusted so as to be orthogonal to the rotation axis Cr more finely than in the first stage.

Subsequently, the process returns to Step S21 and Steps S21 to S24 are repeated until the attitude of the lens L satisfies the converging conditions.

Thus, the optical axis Ao of the lens L is sufficiently level-adjusted with respect to the plane orthogonal to the rotation axis Cr.

Measurement Operation

The lens-measuring machine 1 performs the measurement operation of the lens measurement surface Lm after completing the level adjustment process.

Figure 9:
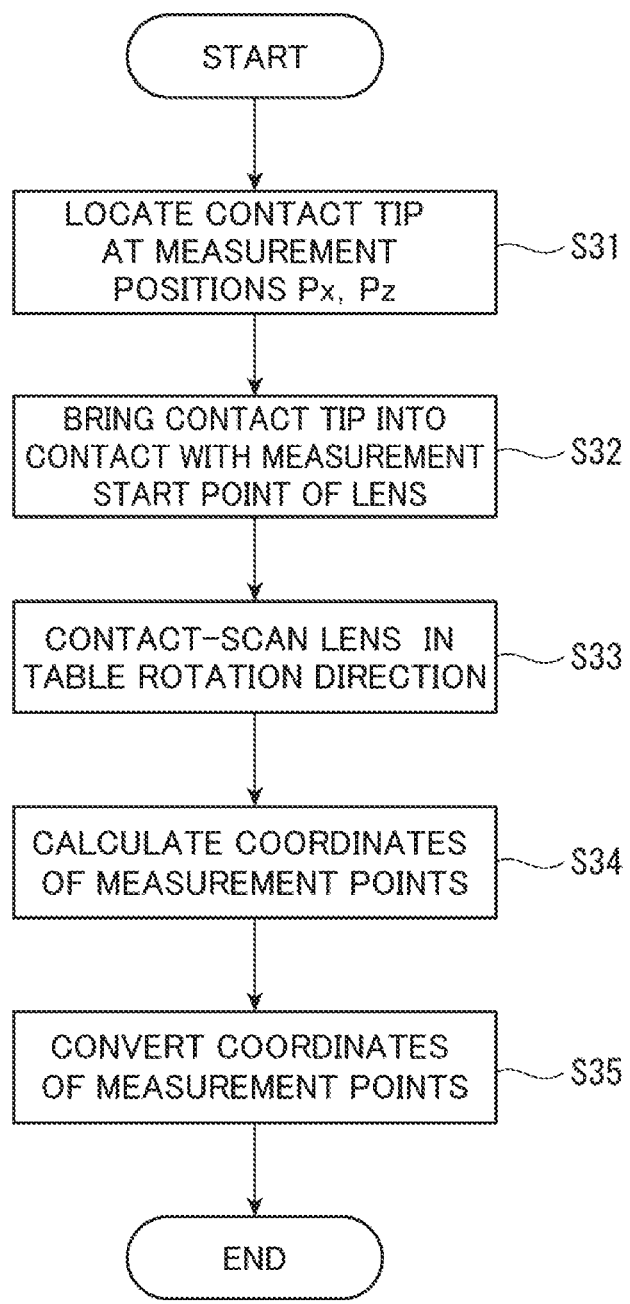
FIG. 9 is a flow chart showing a lens-measuring process according to the exemplary embodiment.

The measurement operation of the lens-measuring machine 1 will be described below with reference to a flow chart in FIG. 9. It should be noted that the profile of a cross section of the lens L through which the optical axis Ao passes is supposed to be measured in the description below.

Initially, the motion controller 61 controls the detector driver 30 to locate the contact tip 43 at measurement positions Pz, Px (Step S31).

Figure 10:
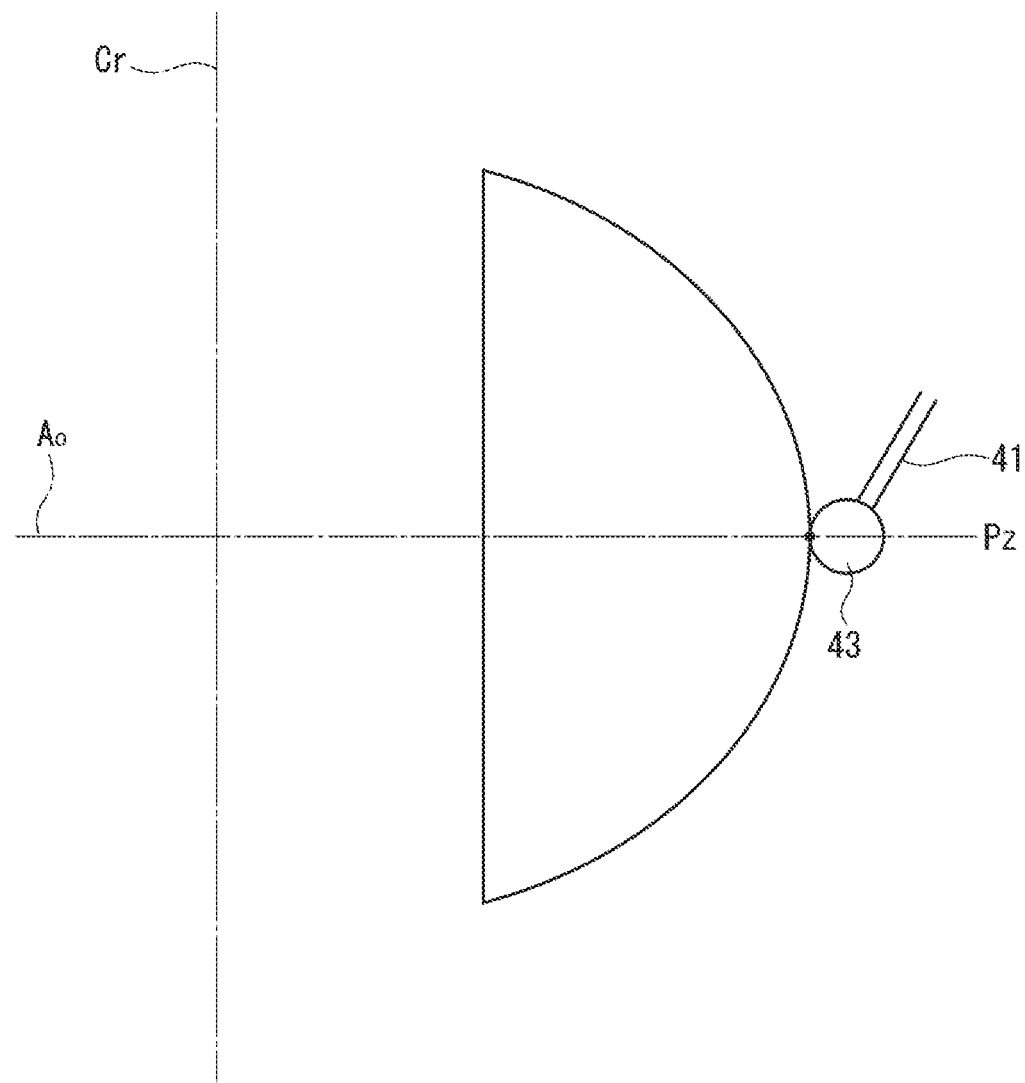
FIG. 10 is a schematic illustration showing a relationship between the lens and the contact tip in the lens-measuring process according to the exemplary embodiment.

The measurement position Pz is aligned with the optical axis Ao of the lens L in the Z-axis direction (see FIG. 10). The measurement position Pz may be set in advance based on the designed value of the lens L or the like. Alternatively, the measurement position Pz may be detected by the motion controller 61 through the above-described level adjustment process.

The measurement position Px is a position at which the contact tip 43 contacts the lens measurement surface Lm with a predetermined pressure after the contact tip 43 positioned at the measurement position Pz approaches the lens measurement surface Lm (see FIG. 5).

After Step S31, the motion controller 61 controls the rotary drive 25 to rotate the table 20 in the state shown in FIG. 5 by a predetermined angle θp1. This rotation causes the contact tip 43 to contact a measurement start point Ps of the lens L (Step S32, see FIG. 11). The predetermined angle θp1 may be set in advance based on the designed value of the lens L or the like. Alternatively, the predetermined angle 9p1 may be set by the motion controller 61 based on the measurement data obtained in the above-described level adjustment process.

After Step S32, the motion controller 61 controls the rotary drive 25 to rotate the table 20 in the state shown in FIG. 11 by a predetermined angle θp2. This rotation causes the contact tip 43 to slide in contact on the lens measurement surface Lm from the measurement start point Ps to a measurement end point Pf, and displace the contact tip 43 in conformity with the profile of the lens measurement surface Lm (see FIG. 12). In other words, the contact tip 43 contact-scans the lens measurement surface Lm along the rotation direction of the table 20 (Step S33; contact-scanning step).

It should be noted that the predetermined angle θp2 is an angle for the contact tip 43 to contact-scan a desired area of the lens measurement surface Lm. The predetermined angle θp2 may be set in advance based on the designed value of the lens L or the like. Alternatively, the predetermined angle θp2 may be set by the motion controller 61 based on the measurement data obtained in the above-described level adjustment process.

During Step S33, the stylus 41 is displaced in the X-axis direction in conformity with the profile of the lens measurement surface Lm and the displacement detector 42 outputs a displacement signal (displacement Δr) in proportion to the displacement of the stylus 41.

Further, during Step S33, the angle detector 62 reads the current rotary angle θ of the table 20 via the angle sensor 26, and the contact point detector 63 records the displacement Δr outputted by the detector 40 for every predetermined rotary angle θ.

Figure 13:
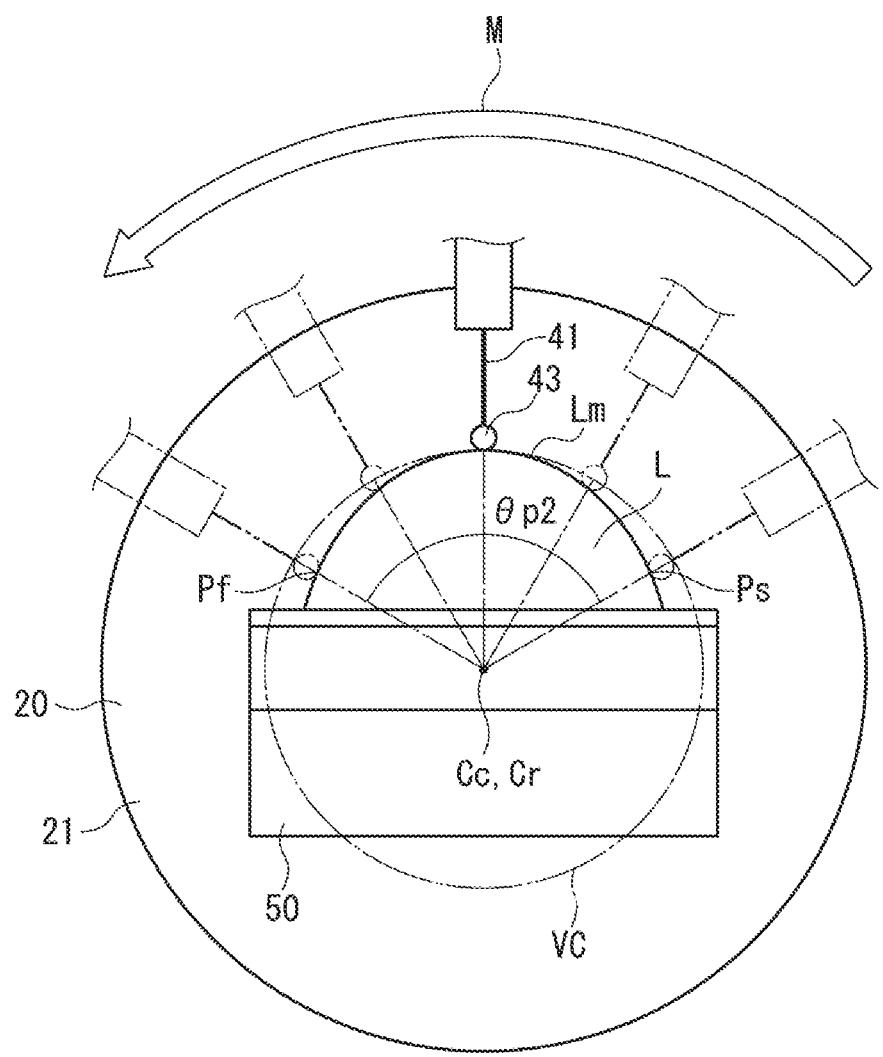
FIG. 13 is a schematic illustration showing a movement of the contact tip relative to the lens in the lens-measuring process according to the exemplary embodiment.

FIG. 13 shows a movement of the contact tip 43 relative to the lens measurement surface Lm while the table 20 is rotated in Step S33. As shown in FIG. 13, a rotation direction M of the table 20 is aligned with the circumferential direction of the approximate circle VC of the lens L. Accordingly, while the table 20 is rotated, the contact tip 43 contacts the lens measurement surface Lm at an approximately constant angle. Thus, approximately the same portion of the contact tip 43 contacts the lens measurement surface Lm.

It should be noted that, since the lens L has an aspherical surface, a slight deviation is present between the approximate circle VC of the lens L and the lens measurement surface Lm, and the angle of the contact tip 43 slightly changes depending on the magnitude of the deviation. However, the area of the contact tip 43 contacting the lens measurement surface Lm is kept sufficiently narrow as compared with a typical contact-scanning measurement.

After Step S33, the data processor 64 calculates coordinates information of the lens measurement surface Lm in a form of polar coordinates of a plurality of measurement points located along the scanning line of the contact tip 43 based on the obtained rotary angle θ and the displacement Δr (Step S34; coordinate calculation step). It should be noted that the number of the plurality of measurement points is not specifically limited.

Figure 14:
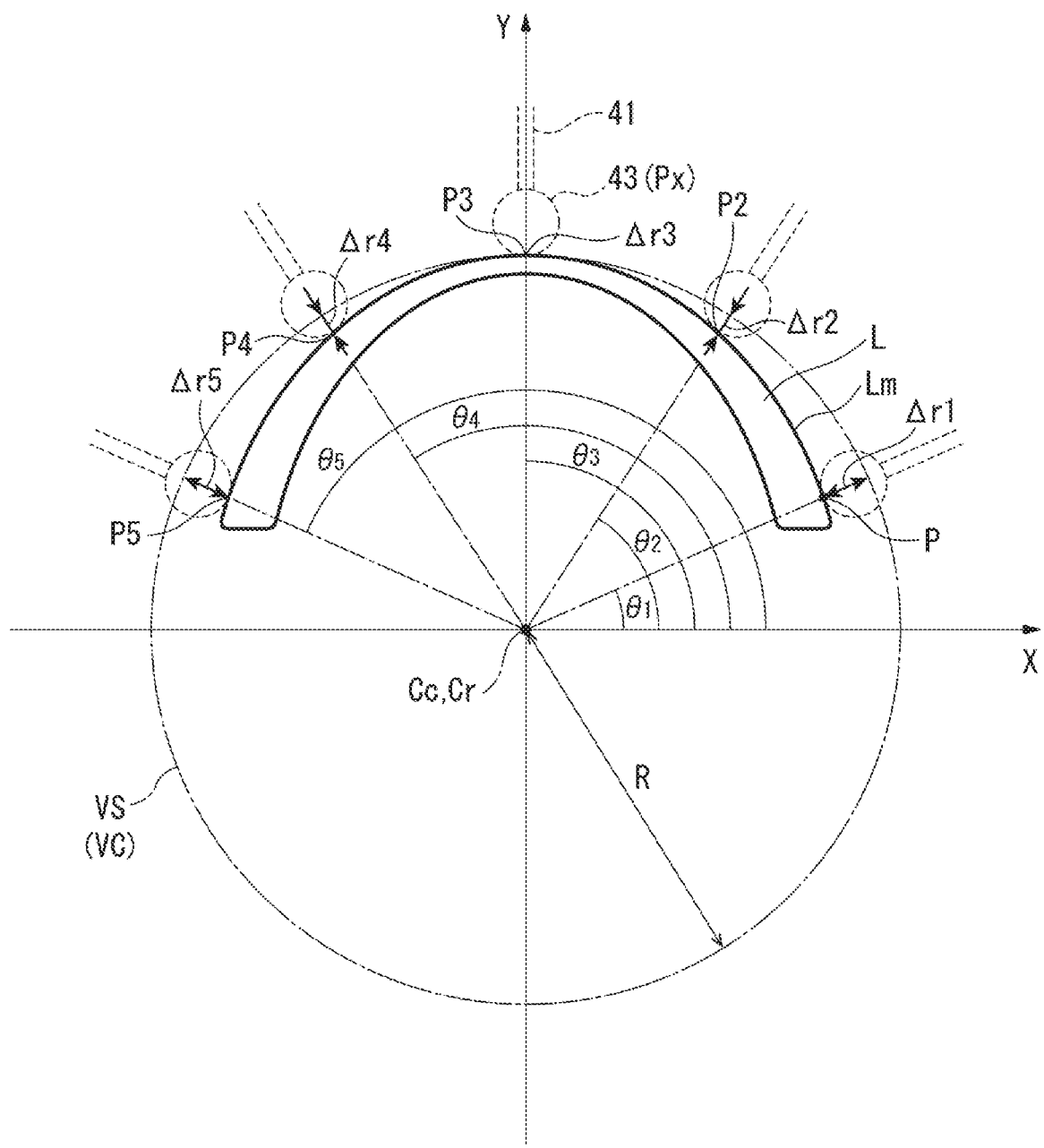
FIG. 14 illustrates an example of XY coordinates of the table and measurement points of the lens according to the exemplary embodiment.

FIG. 14 shows XY coordinate system on the table 20, whose origin is set at a point on the rotation axis Cr, and measurement points P1 to P5 calculated in Step S34.

It should be noted that, in this exemplary embodiment; the Y-axis on the table 20 is substantially parallel to the X-axis of the measuring machine body 10 and the X-axis on the table 20 is substantially parallel to the Y-axis of the measuring machine body 10 when the contact tip 43 is located at the measurement position Px (Step S31).

Further, a reference circle VS; whose radius is equal to a distance R between the contact tip 43(Px) located at the measurement position Px and the rotation axis Cr, is illustrated in an imaginary line (chain line) in FIG. 14.

r-value of the polar coordinates of each of measurement points P1 to P5 is calculated by adding the distance R to the displacement Δr at the corresponding measurement points, and a θ value is calculated as the rotary angle θ at the corresponding measurement points P1 to P5.

Specifically; the polar coordinates of the measurement point P1 is (R+Δr1; θ1), the polar coordinates of the measurement point P2 is (R+Δr2, θ2), the polar coordinates of the measurement point P3 (initial position) is (R+Δr3, θ3), the polar coordinates of the measurement point P4 is (R+Δr4; θ4), and the polar coordinates of the measurement point P5 is (R+Δr5, θ5).

Subsequently, the data processor 64 converts the polar coordinates of each of the measurement points P1 to P5 calculated in Step S34 to Cartesian coordinates (XY coordinates) (Step S35; coordinates conversion step). The following formula (1) is used for the conversion.

$$x = r \cos \theta$$
$$y = r \sin \theta \quad \text{formula (1)}$$

XY coordinates of each of the measurement points P1 to P5 can be obtained in Step S35. The coordinates information of the cross-sectional profile of the lens L through which the optical axis Ao passes can thus be obtained in a form of XY coordinates.

The measurement operation of the lens-measuring machine 1 is thus ended.

Advantages of Exemplary Embodiment

In the exemplary embodiment, the contact tip 43 contact-scans the lens measurement surface Lm along the rotation direction of the table 20 to perform the measurement operation of the lens L. During the contact-scanning, the contact tip 43 contacts the lens measurement surface Lm at an approximately constant angle. Accordingly, the area of the contact tip 43 that contacts the lens measurement surface Lm becomes sufficiently narrow as compared with the typical linear contact-scanning. Accordingly, the sphericity of the contact tip 43 less affects the measurement accuracy, thereby allowing a highly accurate measurement.

A typical roundness measuring machine can be used for the contact-scanning in the exemplary embodiment, thus requiring no complicated machine arrangement and control of thereof. Further, through the conversion of the polar coordinates into Cartesian coordinates by the data processor 64, the profile information of the lens measurement surface Lm can be easily obtained.

Accordingly, the lens profile can be highly accurately and easily measured in the exemplary embodiment.

In the exemplary embodiment, the first stage of the level adjustment process, in which the attitude of the lens L is adjusted based on the coarse adjustment amount calculated by the adjustment amount calculator 65, is initially performed. Accordingly, the accuracy in the subsequent second stage of the level adjustment process can be enhanced.

In the exemplary embodiment, the second stage of the level adjustment process, in which the attitude of the lens L is adjusted based on the fine adjustment amount calculated by the adjustment amount calculator 65, is performed. Accordingly, the lens measurement surface Lm, which is subsequently measured, can be more accurately measured.

In the exemplary embodiment, the lens L is disposed so that the center of curvature Cc of the lens measurement surface Lm coincides with the rotation axis Cr of the table 20. When the lens L is disposed as described above, the lens measurement surface Lm can be suitably located along the rotation direction of the table 20. Accordingly, the portion of the contact tip 43 contacting the lens L can be narrower.

Modifications

It should be noted that the scope of the invention is not limited by the above-described exemplary embodiment, but encompasses modifications and the like compatible with an object of the invention.

The attitude of the lens L on the table 20 as described in Step S11 is not necessarily strictly determined but a slight deviation is tolerable.

Figure 15:
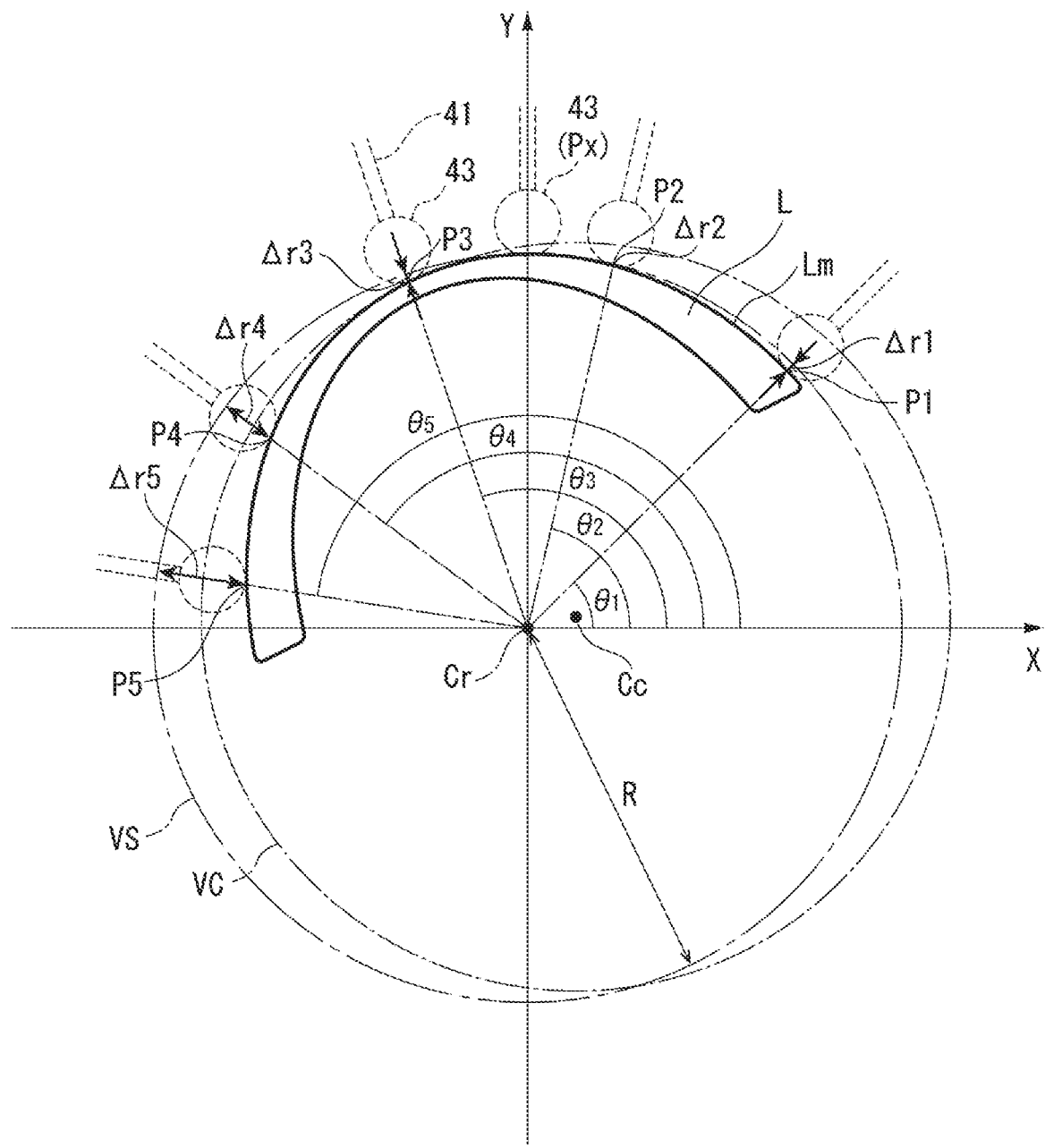
FIG. 15 illustrates another example of the XY coordinates of the table and the measurement points of the lens according to the exemplary embodiment.

For instance, as shown in FIG. 15, the center of curvature Cc of an area of the lens measurement surface Lm intersecting the optical axis Ao is not aligned with the rotation axis Cr of the table 20 and the approximate circle VC of the lens measurement surface Lm is different from the reference circle VS (radius: the distance R) in some embodiments of the invention. Further, the contact tip 43(Px) of the measurement position Px contacts a portion of the surface of the lens L other than the intersection with the optical axis Ao (vertex) in some embodiments of the invention.

The level adjustment process and the lens-measuring process can be performed with the above attitude of the lens L in the same manner as in the exemplary embodiment, where the portion of the contact tip 43 contacting the lens measurement surface Lm is kept sufficiently narrow as compared with a typical contact-scanning measurement. Thus, it is not necessary in the invention to perform centering of workpiece as conducted for a typical roundness measurement.

In a modification of the invention, the lens L is disposed so that the center of curvature of an area of the lens measurement surface Lm other than the area intersecting the optical axis Ao coincides with the rotation axis Cr of the table 20.

It should however be noted that the lens L is preferably disposed on the table 20 so that the displacement Δr of the stylus 41 is kept within a displaceable range of the stylus 41 when the contact tip 43 contact-scans the lens L in the rotation direction of the table 20.

Figure 16:
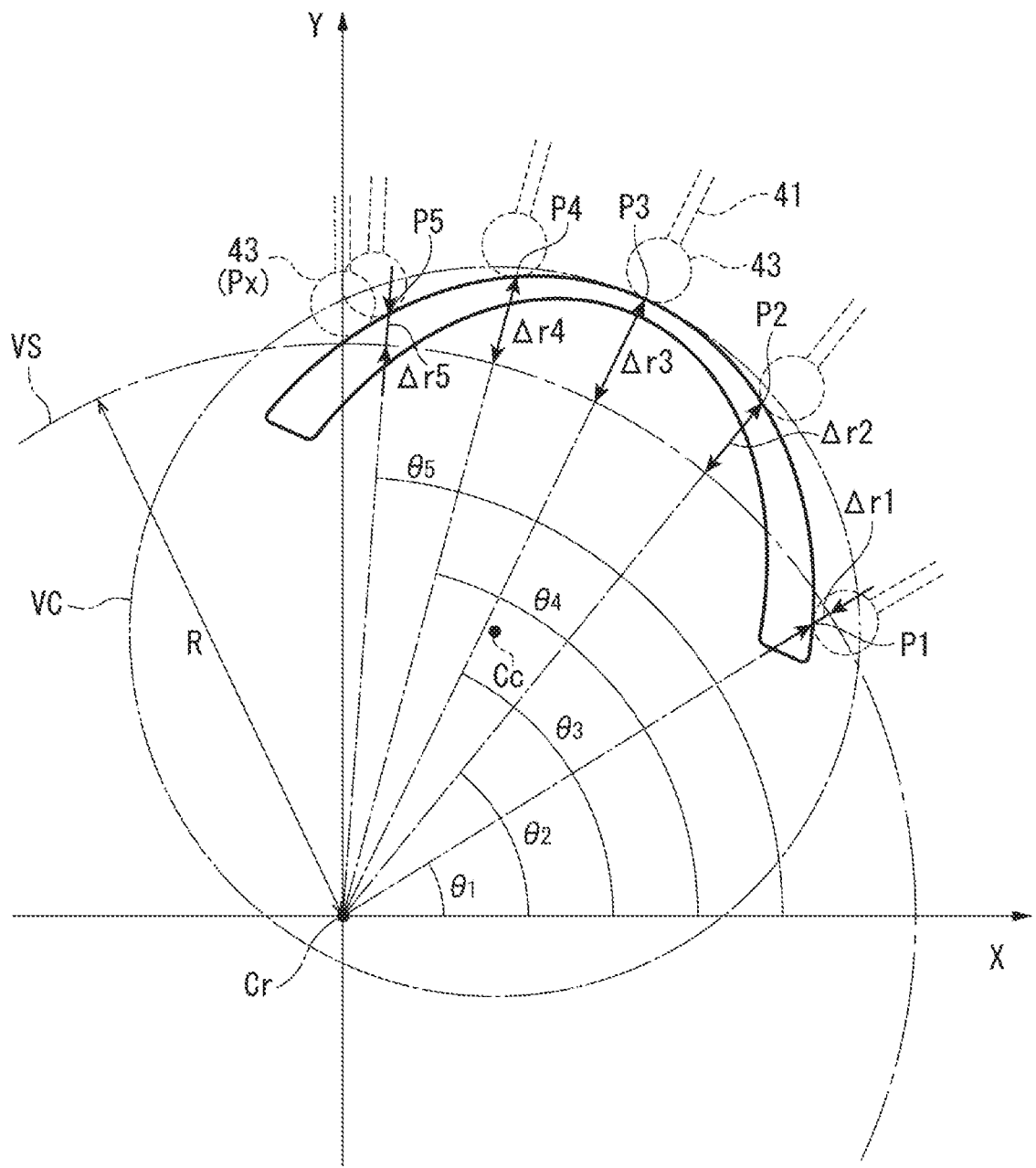
FIG. 16 illustrates still another example of the XY coordinates of the table and the measurement points of the lens according to the exemplary embodiment.
Figure 17:
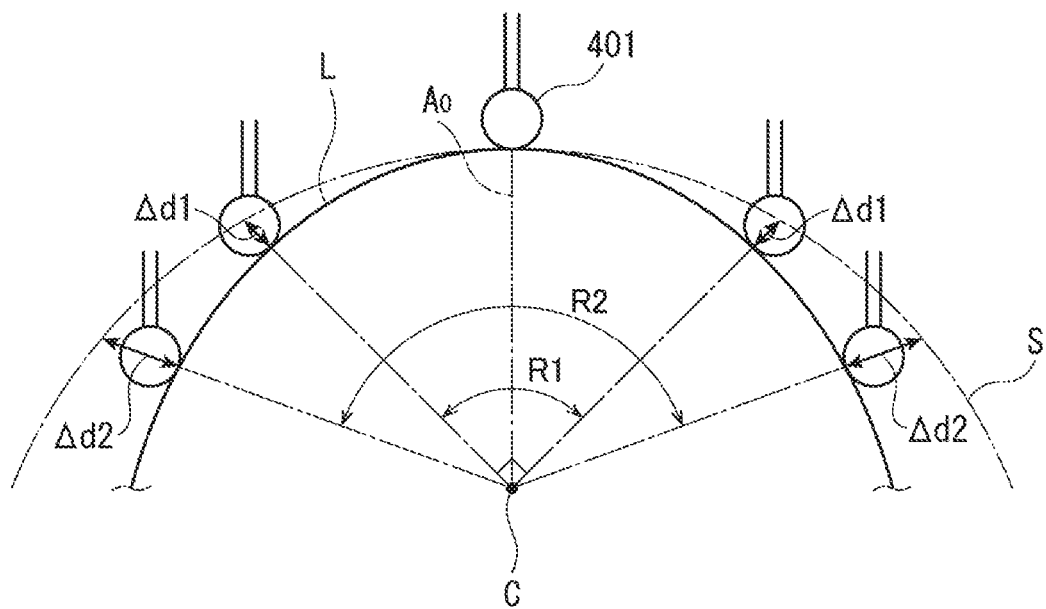
FIG. 17 is a schematic illustration showing a typical lens-measurement method.

Accordingly, when the displacement dr at the measurement points P1 to P5 possibly becomes relatively large as shown in FIG. 16, not only the inclination of the lens L but also the disposition of the lens L is detected in, for instance, Step S12 in the level adjustment process in some embodiments of the invention. When it is determined that the disposition of the lens L is not within the tolerable range (i.e. a range in which the displacement Δr is kept within a displaceable range of the stylus 41), the stage plate 22 of the table 20 is moved or the table 20 is rotated to adjust the disposition of the lens L in some embodiments of the invention.

Though the detector 40 performs the contact-scanning measurement on the lens measurement surface Lm in the Z-axis direction in the first stage of the level adjustment process in the exemplary embodiment, the scope of the invention is not limited thereto. For instance, the lens measurement surface Lm is measured by intermittently bringing the contact tip 43 into contact with the lens measurement surface Lm along the Z-axis direction (i.e. multiple-point measurement) in some embodiments of the invention.

In the exemplary embodiment, the cross-sectional profile of the lens L passing through the optical axis Ao is measured in the lens-measuring process. Accordingly, the measurement position Pz at which the contact tip 43 is located in Step S31 is on the optical axis Ao of the lens L located in the Z-axis direction. However, the scope of the invention is not limited thereto. For instance, the measurement position Pz may be set at any position in the Z-axis direction depending on the cross-sectional profile of the lens L (workpiece).

The measurement position Px at which the contact tip 43 is located in Step S31 is a position for the contact piece 43 to contact the lens measurement surface Lm with a predetermined pressure after the contact tip 43 approaches the lens measurement surface Lm in the exemplary embodiment. However, the scope of the invention is not limited thereto. For instance, when the lens L is disposed on the table 20 with some degree of accuracy in Step S11, the measurement position Px may be a predetermined reference position based on the designed value of the lens L.

Though the level adjustment process is performed before the lens-measuring process in the exemplary embodiment, the level adjustment process is not requisite.

When the level adjustment process is performed, only the first stage or the second stage is performed in some embodiments. For instance, when only the first stage is performed, the converging conditions of the attitude of the lens L in Step S13 may be determined so as to be sufficient for the subsequent measurement operation.

The converging conditions for the attitude of the lens L are not set in the first stage of the level adjustment process, and the second stage is performed after one coarse adjustment in some embodiments of the invention.

The workpiece in the form of the lens in the invention is not specifically limited, and various lenses such as a convex lens, concave lens and aspheric lens are measurable.

In the exemplary embodiment, the lens measurement surface Lm is a convex aspherical surface. However, the lens measurement surface Lm is not necessarily a convex aspherical surface but is a concave aspherical surface or a (concave or convex) spherical surface in some embodiments of the invention.

For instance, when the lens measurement surface Lm is a concave aspherical surface or (concave) spherical surface, it is preferable in Step S11 that the lens measurement surface Lm is located so that the center of curvature Cc of the area of the lens measurement surface Lm at the intersection with the optical axis Ao substantially coincides with the rotation axis Cr in the same manner as in the exemplary embodiment. Further, while the contact tip 43 contact-scans the lens measurement surface Lm in Steps S21 and S33, the detector 40 may be appropriately moved in the X-axis direction to keep the contact tip 43 from being excessively pressed against the concave lens measurement surface Lm.

The lens holder 50, which is configured to hold a periphery of the lens L in the exemplary embodiment, is configured to suck and hold a surface of the lens L opposite the lens measurement surface Lm in some embodiments of the invention. Further, the lens holder of the invention is not necessarily configured as described above, but may be provided by any suitable existing lens holder.

What is claimed is:

1. A lens-measuring machine comprising:
   a table rotatable around a rotation axis;
   a lens holder configured to hold a workpiece in a form of a lens, the lens holder being placed on the table so that an optical axis of the lens becomes orthogonal to the rotation axis;
   a contact tip configured to contact a lens measurement surface defined at a part of a surface of the lens;
   an angle sensor configured to detect a rotary angle of the table;
   a displacement detector configured to detect a displacement of the contact tip; and
   a data processor configured to calculate coordinates information of the lens measurement surface in a form of polar coordinates whose origin is at the rotation axis based on the displacement of the contact tip for every rotary angle of the table; and convert the calculated polar coordinates to Cartesian coordinates.

2. The lens-measuring machine according to claim 1, wherein
   the lens holder is placed on the table so that a center of curvature of a predetermined area of the lens measurement surface coincides with the rotation axis.

3. The lens-measuring machine according to claim 1; further comprising:
   a driver configured to move the contact tip along the rotation axis so that the contact tip contacts the lens measurement surface; and
   an adjustment amount calculator configured to calculate a coarse adjustment amount for adjusting an attitude of the lens so that the optical axis of the lens becomes orthogonal to the rotation axis based on drive information of the contact tip moved by the driver.

4. The lens-measuring machine according to claim 3, wherein
   the adjustment amount calculator is configured to calculate a fine adjustment amount for adjusting the attitude of the lens so that the optical axis of the lens becomes orthogonal to the rotation axis based on plural sets of the Cartesian coordinates obtained at different positions in a direction along the rotation axis.

5. A method of measuring a lens using a lens-measuring machine comprising a table configured to rotate around a rotation axis, a contact tip configured to contact a workpiece placed on the table, an angle sensor configured to detect a rotary angle of the table, and a detector configured to detect a displacement of the contact tip, the method comprising:
   placing the workpiece in a form of a lens on the table so that an optical axis of the lens becomes orthogonal to the rotation axis;
   contact-scanning a lens measurement surface, which is defined by a predetermined area on a surface of the lens, by bringing the contact tip into contact with the lens measurement surface and rotating the table with the lens placed thereon by a predetermined angle;
   calculating coordinates information of the lens measurement surface in a form of polar coordinates whose origin is at the rotation axis based on displacement of the contact tip for every rotary angle of the table; and converting the calculated polar coordinates to Cartesian coordinates.

6. The method of measuring a lens according to claim 5, wherein the lens is placed so that a center of curvature of a predetermined area of the lens measurement surface coincides with the rotation axis.

7. The method of measuring a lens according to claim 5, further comprising, after placing the lens and before contact-scanning the lens-measurement surface:

moving the contact tip along the rotation axis so that the contact tip contacts the lens measurement surface;

calculating a coarse adjustment amount for adjusting an attitude of the lens so that the optical axis of the lens becomes orthogonal to the rotation axis based on drive information of the contact tip in moving the contact tip; and adjusting the attitude of the lens based on the coarse adjustment amount.

8. The method of measuring a lens according to claim 5, further comprising, after placing the lens and before contact-scanning the lens-measurement surface:

preliminarily measuring the lens measurement surface at mutually different positions in a direction along the rotation axis;

calculating a fine adjustment amount for adjusting an attitude of the lens so that the optical axis of the lens becomes orthogonal to the rotation axis based on plural sets of the Cartesian coordinates obtained in the preliminarily measuring of the lens measurement surface; and adjusting the attitude of the lens based on the fine adjustment amount.

* * * * *